United States Patent
Mahmoudkhani et al.

(10) Patent No.: US 8,268,072 B2
(45) Date of Patent: Sep. 18, 2012

(54) OIL AND GAS WELL CEMENT SYSTEMS USING ELEMENTAL SULFUR

(75) Inventors: Amir Mahmoudkhani, Calgary (CA); Neil Warrender, Calgary (CA)

(73) Assignee: Sanjel Limited Partnership, Calgary, Alberta (CA)

( * ) Notice: Subject to any disclaimer, the term of this patent is extended or adjusted under 35 U.S.C. 154(b) by 654 days.

(21) Appl. No.: 12/394,864

(22) Filed: Feb. 27, 2009

(65) Prior Publication Data

US 2009/0241803 A1 Oct. 1, 2009

Related U.S. Application Data

(60) Provisional application No. 61/031,898, filed on Feb. 27, 2008.

(51) Int. Cl.
*C04B 22/02* (2006.01)
(52) U.S. Cl. .................. 106/736; 106/724; 106/705
(58) Field of Classification Search .............. 106/709, 106/736, 724, 705
See application file for complete search history.

(56) References Cited

U.S. PATENT DOCUMENTS

| | | | | |
|---|---|---|---|---|
| 3,954,480 A | * | 5/1976 | Inderwick | 106/724 |
| 4,097,299 A | * | 6/1978 | Bertozzi | 106/287.32 |
| 4,293,463 A | * | 10/1981 | Vroom | 524/493 |
| 4,426,456 A | * | 1/1984 | Gillott et al. | 501/84 |
| 4,426,458 A | * | 1/1984 | Woodhams | 501/140 |
| 4,496,659 A | * | 1/1985 | Nimer et al. | 501/140 |
| 8,021,478 B2 | * | 9/2011 | Ramirez Tobias et al. | 106/739 |
| 8,029,618 B2 | * | 10/2011 | Al-Shafei | 106/745 |

OTHER PUBLICATIONS

Gartner, Ellis; Industrially Interesting Approaches to "Low CO2" Cements; Cement and Concrete Research 34; pp. 1489-1498; 2004; Science Direct; Pergamon.

Pajerski, Jan; Standard Test Method for Flexural Strength of Hydraulic-Cement Mortars; Designation C 348-02; 2007; ASTM International.

* cited by examiner

*Primary Examiner* — Paul Marcantoni
(74) *Attorney, Agent, or Firm* — Bennett Jones LLP (57) ABSTRACT

A cement composition for cementing an oil or gas well includes Portland cement, water and a sulfur component. The cement composition may be used to cement a well bore by creating a cement slurry including the sulfur component, pumping the slurry into the well bore to a selected location and allowing it to solidify.

16 Claims, 6 Drawing Sheets

Figure 6: Comparison of the normalized Sulfur K-edge XANES spectra of samples 1, 2 & 4.

OIL AND GAS WELL CEMENT SYSTEMS USING ELEMENTAL SULFUR

CROSS REFERENCE TO RELATED APPLICATIONS

This application claims the priority benefit of U.S. Provisional Application No. 61/031,898 filed on Feb. 27, 2008 entitled "Oil and Gas Well Cement Systems Using Elemental Sulfur", the contents of which are incorporated herein by reference.

FIELD OF INVENTION

The invention relates to cement compositions containing a sulfur component, and in particular, to a sulfur containing Portland cement blend for use in the construction of oil and gas wells.

BACKGROUND

In the drilling and completion of an oil or gas well, a cement composition is introduced to the well bore for cementing pipe string or casing in a process known as "primary cementing". The cement composition is pumped into the annular space between the walls of the well bore and the casing and sets in the annular space, supporting and positioning the casing, and forming a substantially impermeable barrier, or cement sheath, which isolates the well bore from subterranean zones.

A primary component of this cement composition is Portland cement. Worldwide, it is estimated that 1.8 billion tonnes of Portland cement are produced annually, making it one of the most widely used products in the building and construction industry. The firing process that creates the active cement "clinker" accounts for around one tonne of $CO_2$ emissions to the atmosphere for every tonne of Portland cement manufactured. As a consequence, the use and manufacture of Portland cement is responsible for about 5% of anthropogenic greenhouse gases emitted to the atmosphere. While the production of Portland cement is damaging to the environment, it is currently the raw material of choice in the construction industry for the preparation of concrete and also in the oil and gas well cementing industry. This results in a heavy demand for Portland cement, which has led on occasion to shortages of supply and cost increases. Products, known as "extenders" are available that can be added to a cement mix as a replacement for Portland cements, however, introduction of some of these materials, such as clays, may result in a deterioration of set cement properties, including loss in compressive strength.

There exists a need for a material that is widely available, cost effective and environmentally friendly that can be added to oil and gas well cement. Such a material must not cause a substantial deterioration in the physical properties of the set cement, and ideally it would enhance the physical and mechanical properties of the set cement.

Sulfur is a known component of certain concretes with construction and industrial applications. Sulfur concrete is similar in final appearance to Portland cement concrete, however, its manufacture, handling and testing are different, in part because it does not contain Portland cement or a pozzolanic material.

Sulfur concrete is created by mixing molten sulfur with aggregate at 132-141° C. and allowing the mixture to solidify upon cooling. Ultimate strength is reached in a short time. It exhibits favorable fatigue properties and has excellent resistance to acids, salts, and many organic compounds. It works well as a rapid runway repair material. Sulfur concrete also has unfavorable properties. It has poor durability when exposed to large temperature changes and to wet curing conditions. The material is also brittle.

By general definition, a cement is a binder; a substance which sets and hardens independently, and can bind other materials together. The term "sulfur cement", used in the prior art dealing with sulfur concrete, refers to sulfur which has been used as a binder for aggregates such as sand, gravel, stone chips or ballast, as well as lightweight aggregates such as pumice and tuff. None of the sulfur cements reported to date contain Portland cement.

A process of modifying sulfur by reacting it with olefinic hydrocarbon polymers can be used for sulfur cements. A similar reaction yields a sulfur soluble polymer concentrate which has been mixed with aggregate to form sulfur concrete, which has been commercially available.

U.S. Pat. No. 4,025,352 issued on May 24, 1977, describes the manufacture of sulfur concrete. The inventors report the manufacturing of NS/ND 22 sulfur concrete, for example, by premixing 95 parts by weight sulfur and 5 parts by weight of liquid dicyclopentadiene at 135° C. and the premix was left at this temperature for 135 minutes. The 100 parts of liquid binder is then poured onto 354.5 parts by weight of DIN 1,164 standard sand, which was at the same temperature (135° C.) and mixing was continued for 15 minutes.

Sulfur concrete does not contain Portland cement and it requires sulfur rather than water as a binder. It cannot be prepared under normal temperatures or by using conventional equipment. It is therefore, apparent that known forms of sulfur concrete are not suitable for oil well cementing applications.

The use of sulfur as an oil and gas well cement presents potential problems associated with the use of sulfur in a downhole environment. It could be expected that elemental sulfur would be inert in the presence of inorganic cementitious materials, and therefore, its addition to a cement blend in any significant quantity could result in a deterioration in mechanical cement properties. Important cement properties include rheology, thickening time, transition time, flexural strength and compressive strength. In order to be useful for oil well cementing, cement blends containing extender type materials must be viable in terms of all of these physical properties.

SUMMARY OF INVENTION

This invention relates to Portland cement compositions containing a sulfur component. The inventors have found that sulfur can be used as an extender in Portland cement blends while maintaining a usable compressive strength for downhole use, and that it can enhance both the long term compressive and flexural strength of a cement blend. Sulfur containing cements were also found to have excellent and controllable "right angle set" transition times, making them useful for oil well completion operations. Embodiments of sulfur containing cement were found to show improved acid resistance. Embodiments of sulfur containing cement were found to have advantageous properties when compared to similar cement compositions not including the sulfur component.

Therefore, in one aspect, the invention comprises a cement composition for use in a cementing process of an oil and gas well, said composition comprising a sulfur component, Portland cement, and water. In one embodiment, the composition of claim 1 further comprising one or more of the following additives: a retarder, a fluid loss control agent, an accelerator, a dispersant, a cementitious material, or a pozzolanic material. The Portland cement may comprise a type A or a type G cement. In one embodiment, the composition may further comprise a sulfur cross-linking agent, which may be a styrene-butadiene copolymer or a poly-sulfur silane coupling agent.

In another aspect, the invention may comprise a method of cementing an oil and gas well having a wellbore, comprising the step of creating a pumpable cement slurry, and introducing the slurry into the wellbore, wherein said slurry comprises water, a Portland cement and a sulfur component. The cementing operation may be a primary or a remedial cementing operation.

BRIEF DESCRIPTION OF THE DRAWINGS

Exemplary embodiments of the invention will now be described with reference to the following drawings.

DETAILED DESCRIPTION OF THE INVENTION

When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

Sulfur, a nonmetallic element, is widely distributed in nature and is an important constituent of animal and plant life. Elemental sulfur occurs naturally by replacement reactions with anhydrite and gypsum in salt-dome cap rocks and bedded evaporates. It is also common in volcanic environments and associated with thermal springs. Native sulfur is readily oxidized, particularly in the presence of sulfur-oxidizing bacteria and so it is somewhat ephemeral in nature. Surface exposures are relatively rare and are generally restricted to regions of ongoing or very recent mineralization. Most of the sulfur that is currently produced comes as high purity by-product from natural gas and petroleum refineries.

The cement compositions of the present invention include Portland cement, water and a sulfur component. The inventors have found that the theoretical drawbacks of using a cement including sulfur as a component in a downhole environment may not prevent its utility in oil and gas well cementing. Sulfur containing cement blends were found to have adequate physical characteristics of the cement blend such as acid resistance, transition time and long term strength, and in many instances improved physical characteristics when compared to cement blends without sulfur. While some deterioration in short term compressive strength was observed in some embodiments, sulfur-containing blends described herein meet the minimum regulatory requirement of 3.5 MPa compressive strength after 48 hours, and therefore are considered viable oil well cement blends.

Other concerns regarding the use of sulfur in downhole cement include $H_2S$ formation, sulfur leaching, phase separation and potential negative effects on cement rheology. Rheology studies also described show no detrimental effect of sulfur on cement rheology. The inventors have seen no evidence of the formation of $H_2S$ in sulfur containing cement and consider it unlikely as the formation of $H_2S$ is favored in an acidic environment, rather than the extremely caustic environment of cement.

Therefore, in one aspect, the invention comprises the use of a sulfur-containing cement composition in a cementing process of an oil and gas well.

The sulfur cement compositions of the present invention comprise Portland cement, a sulfur component, and water. Water is present in the cement composition in an amount necessary to make a slurry that can be pumped downhole. Any type of water can be used provided that it does not contain chemicals or contaminants that adversely affect the properties of the cement composition. In one embodiment, the water is present in an amount from about 22 to 200% by weight of cement, and more preferably from 40 to 100% by weight of cement.

The cement slurry is used by pumping it into a wellbore and allowing the slurry to set, according to conventional techniques well known to those skilled in the art. The cementing process may be a primary cementing process, or a remedial cementing process such as, for example, squeeze cementing or plug cementing. The actual cementing process is well known and need not be further described herein.

The cement compositions described herein comprise a suitable Portland cement, for example, Class A, B, C, G or H Portland cements, as defined by the American Petroleum Institute standards. In one embodiment, the cement compositions comprise a Class A or a Class G cement.

In one embodiment, the sulfur component is preferably added to the blend as substantially pure elemental sulfur. The term "substantially pure" means greater than about 90% purity. In one embodiment, the sulfur is greater than about 98% pure, meaning that less than about 2% by weight is an impurity. In other embodiments, larger amounts of impurities may be tolerated if they are not detrimental to the cement properties. Suitable sulfur may be obtained as a by-product of gas processing of sour natural gas, or other hydrocarbon refining processes.

The term "finely divided" means that the sulfur particles are relatively small so that the sulfur is reasonably homogenously distributed in the cement blend, once the cement slurry has been formed. In one embodiment, the sulfur is added to a mixer as a prill (about 2 mm to about 5 mm in size), which is further comminuted during the mixing and slurry production process. Alternatively, the sulfur may be finely divided prior to addition to the cement blend. As a result, the sulfur particles in the cement slurry which is pumped downhole may be less than 1 mm in size, preferably less than about 500 microns, and more preferably less than about 300 microns. In one embodiment, the sulfur particles are finely divided, and the portion which passes through a size 70 mesh (<212 microns) is used.

Some or all of the elemental sulfur may react with components of the cement blend when mixed together, and will result in various sulfur compounds in the cement. As used herein, the term "sulfur component" is intended to encompass elemental sulfur and all sulfur species which may form over time from blending elemental sulfur with cement (its reaction products) and the other components of the cement blend described herein and being used in the manner contemplated herein.

In one embodiment, the sulfur component may comprise between about 0% to about 40% by weight of the cement composition, preferably between about 5% to about 30%, and more preferably between about 10% to about 20%.

In one embodiment, various additives, or combinations of additives, may be used to alter or enhance the physical properties of the cement composition. According to one embodiment, accelerating additives may be added to increase early compressive strength development. Typical accelerating additives include but are not limited to sodium sulfate, hydrated lime, sodium metasilicate and sodium aluminate. Accelerating additives may be used alone or in combination with one another. These additives may be present in a total amount of 0.5 to 12% based on total weight of cement blend, and more preferably in a total amount of about 3 to 9% based on total weight of cement blend.

Other cementitious or pozzolanic materials may be used to supplement the Portland cement, including without limitation, fly ash, blast furnace slag, pumice, metakaolin, zeolites or other similar materials.

In one embodiment, a fluid loss control additive may be added to provide effective fluid loss control to cement blends. Fluid loss control additives may comprise anionic or nonionic water soluble polymers. Typical fluid loss additives include but are not limited to polyvinyl alcohol, cellulose derivatives, galactomanans, polyethylene imine and copolymers of quaternary ammonium or sulfonium chloride.

In another embodiment, dispersants may be added to the cement composition. Dispersants can be used to modify the Theological properties of the cement blend, and in some instances to control fluid loss. Typical dispersants include but are not limited to sodium salts of polynaphthalene sulfonic acid, sodium salts of polymelamine sulfonic acid and polycarboxylate copolymers.

In another embodiment, retarders may be added to prevent the early onset of cement thickening which would render the cement no longer pumpable. Typical retarders include but are not limited to zinc oxide and sodium gluconate.

In another embodiment, sulfur cross-linking agents are used to modify the incorporation of the sulfur component within the cement matrix, and thus improve mechanical properties of the cement blends. Suitable sulfur cross-linking agents include those which act in an analagous manner to rubber vulcanization, and therefore may include latex rubber and synthetic derivatives. Typical cross-linking agents include but are not limited to styrene-butadiene copolymers and poly-sulfur silane coupling agents. Suitable sulfur cross-linking agents include, without limitation, Latex DL 240™ (Dow Reichhold, N.C.) or SCA 98™ (Struktol Company of America, Ohio).

The cement composition is blended and used in cementing oil and gas wells in accordance with conventional methods, including primary and remedial cementing operations. A pumpable slurry is formed on site, or may be formed elsewhere and transported to the well. The slurry is pumped downhole and allowed to set up in a desired location. In one embodiment, the components are dry mixed prior to water addition.

EXAMPLES

The following examples are intended to illustrate embodiments of the claimed invention, and are not intended to limiting of the claimed invention unless explicitly stated to be.

Example 1

Long Term Compressive Strength Development

Development of high early compressive strength is an important performance specification for oilwell cementing. Early strength is important to ensure structural support to the casing and hydraulic/mechanical isolation of downhole intervals. Delays in strength development result in significant amounts of lost time due to the need to wait-on-cement. Nevertheless, long term strength development is required to support mechanical stresses that are experienced during the productive life of a well. Once cement sets, it continues to gain strength to a certain level which depends on characteristics of cementitious material, additives and admixtures, temperature and water/cement ratio. Tests have been used to verify strength development on three blends over a period of two weeks.

In the case of binary cement systems using API Class A or G cement, sulfur is present in percent by weight of blend (BWOB). For example, in a blend of cement G+10% sulfur, 90 g of cement G was mixed with 10 g of sulfur to give a 100 g blend. All additive concentrations are calculated as a percentage of total weight solids present (cement+sulfur). In ternary cement systems, where cement, sulfur and fly ash are used, the fly ash and sulfur content is also expressed by weight of blend. For example, in a 100 g blend of cement A+23% fly ash+23% sulfur, 54 g cement A is mixed with 23 g fly ash and 23 g sulfur. All additive concentrations are then given in percentage of total weight of solids present (cement+fly ash+sulfur). Water is added to obtain the desired slurry density.

All blends were mixed and pre-conditioned at 50° C. for 20 minutes before being transferred into cells for ultrasonic measurements using a Chandler Model 4262 Twin Cell Ultrasonic Cement Analyzer operating at 50° C. and pressurized up to 3000 psi. Each cement slurry used in the work was made from API Class G or A cement blended with fresh Calgary tap water. The slurries were prepared and preconditioned in accordance to the American Petroleum Institute API-RP-10B (the contents of which are incorporated herein, where permitted) procedures. The solids were added to the water in a Waring blender at 4,000 rpm and then the shear rate was increased to 12,000 rpm. For rheology, compressive strength and flexural strength measurements, the slurries were preconditioned for 20 minutes in an atmospheric consistometer operating at bottom hole static temperature (BHST). Compressive strength data were obtained from a Chandler Model 4262 Twin Cell Ultrasonic Cement Analyzer. High purity (>98%) sulfur was obtained from Keyera (Edmonton, Alberta). Samples were ground in the lab and the fraction passing 70 Mesh (<212 microns) was used for blending with cement. Chemical analyses of Cement A, Cement G and fly ash used in this work are given in Table 1.

TABLE 1

Comparative study of chemical analyses of API cements A & G and fly ash (class F)

|  | Fly Ash | Cement A | Cement G |
| --- | --- | --- | --- |
| $SiO_2$ | 60.3 | 20.5 | 20.4 |
| $Al_2O_3$ | 21.4 | 4.00 | 4.44 |
| $Fe_2O_3$ | 4.63 | 4.56 | 4.46 |

TABLE 1-continued

Comparative study of chemical analyses of API cements A & G and fly ash (class F)

|  | Fly Ash | Cement A | Cement G |
|---|---|---|---|
| MgO | — | 3.59 | 3.46 |
| CaO | 6.10 | 62.1 | 61.4 |
| $Na_2O$ | 2.53 | 0.27 | 0.30 |
| $K_2O$ | 1.07 | 0.45 | 0.46 |
| $TiO_2$ | — | 0.16 | 0.15 |
| $P_2O_5$ | — | 0.03 | 0.03 |
| $SO_3$ | 0.16 | 2.05 | 2.87 |
| $Mn_2O_3$ | — | — | — |
| $Cr_2O_3$ | — | — | — |
| $V_2O_5$ | — | — | — |
| LOI | 0.43 | — | — |

Figure 1:
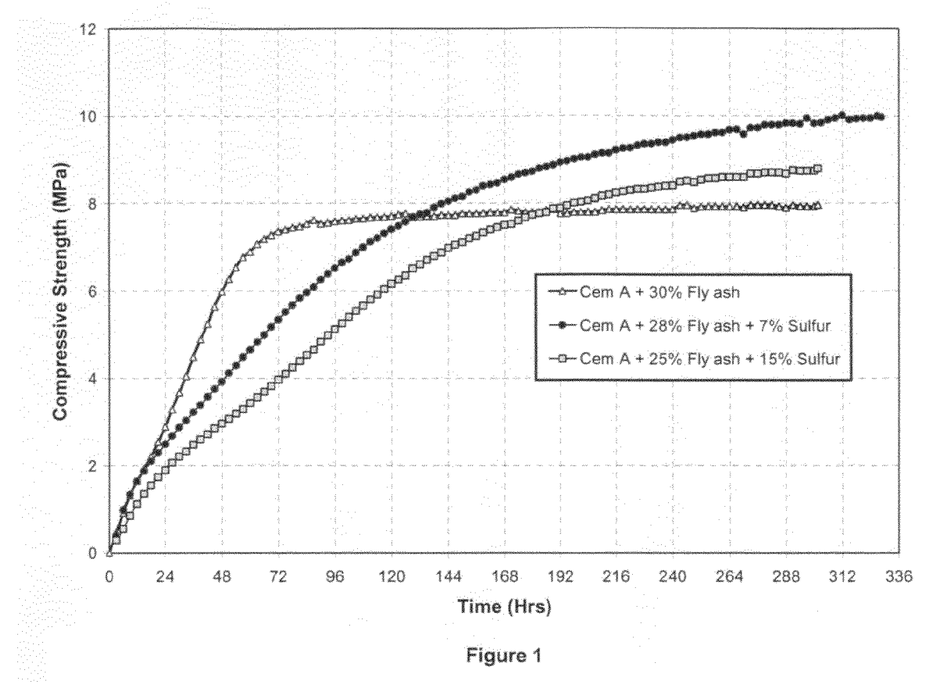
FIG. 1 shows a comparison of compressive strength development for different blends of Class A cement, with and without sulfur.

The results of the long term strength measurements are graphically presented in FIG. 1. The cement A+fly ash (without sulfur) system shows a high early strength development which reaches a maximum of 8 MPa at approximately 96 hours. At this point, the compressive strength of the cement A+fly ash system was seen to plateau, and no increase in strength was seen over the remainder of the test period. While the cement-sulfur blends tested showed a lower rate of the early strength development in comparison to the cement+fly ash system, they continued gaining strength over the two week period so that cement+fly ash+7% sulfur blend reached a compressive strength of about 10 MPa, that is 25% higher than the compressive strength of the cement+fly ash blend. Furthermore, at the end of the two week period, the compressive strength of the sulfur containing blend had not yet begun to plateau, but was still increasing. The cement+fly ash+15% sulfur showed a similar trend and would be expected to reach 9 MPa over the same period, that is 12% higher than what was found for the cement+fly ash blend. Sulfur-containing cement blends appear to have suitable long term compressive strength, which may be higher than traditional (sulfur free) cement blends. FIG. 1 shows a comparison of long term compressive strength with values beyond 1 week.

Example 2

Flexural Strength Measurements

During the life of a well, set cement must support downhole stresses imposed by pressure or temperature fluctuations during drilling, work-over and production operations. Therefore, equally as important as the compressive strength of a cement is its flexural strength. Flexural strength is defined as bending force required to break or mechanically fail a bar of set cement. It is an important mechanical property that, along with Young's modulus, Poisson's ratio and tensile strength, is associated with the elasticity, or ductility of the cement.

Flexural strength measurements were carried out on 4"×1"×1" rectangular prism specimens by the use of a simple beam with centre-point loading as described in the ASTM C348-02 standard [5]. Measurements were taken after the specimens had been cured in 100% relative humidity at 50° C. for a period of 7, 14, 28 or 60 days. Measurements were done in triplicate and the mean values (where available) are given in Table 2. The data indicates that a 15 or 23% replacement of cement with sulfur, did not result in a deterioration of flexural strength. Indeed, replacement of cement with 7% sulfur resulted in higher flexural strength when compared to the parent cement blend. This implies that the addition of an appropriate amount of sulfur can result in an enhancement of cement flexural strength properties. Preliminary data showed that the flexural strength of the cement A+fly ash blend appeared to plateau after 14 days, with no increase in strength observed at 28 days. In all examples, however, the flexural strength of the sulfur containing blends continued to increase up to a period of 60 days. This trend was also observed when comparing the compressive strength of sulfur-containing cements to sulfur-free cement blends and implies that sulfur-containing blends have superior long term strength characteristics compared to those blends that do not contain sulfur.

TABLE 2

Flexural Strength Data for some API Class A Cement blends

| Blend | Density $kg/m^3$ | Curing Temp. (° C.) | Flexural Strength (psi) | | |
|---|---|---|---|---|---|
| | | | 7 days | 14 days | 28 days | 60 days |
| Cem A + 30% Fly ash* | 1400 | 50 | 322 | 452 | 440 | 460 |
| Cem A + 28% Fly ash + 7% S* | 1400 | 50 | 332 | 488 | 540 | 620 |
| Cem A + 25% Fly ash + 15% S* | 1400 | 50 | 330 | 384 | 420 | 480 |
| Cem A + 23% Fly ash + 23% S* | 1400 | 50 | 240 | 300 | 380 | 440 |
| Cem A + 28% Fly ash + 7% S** | 1400 | 50 | 470 | 540 | 620 | 670 |
| Cem A + 28% Fly ash + 7% S*** | 1400 | 50 | 360 | 520 | 580 | 630 |

*Additives: 2% accelerator
**Additives: 2% accelerator + 0.3% retarder + 2% sulfur cross-linker 1
***Additives: 2% accelerator + 0.3% retarder + 2% sulfur cross-linker 2

Example 3

Behavior Under Isothermal and Variable Temperature Conditions

Figure 2:
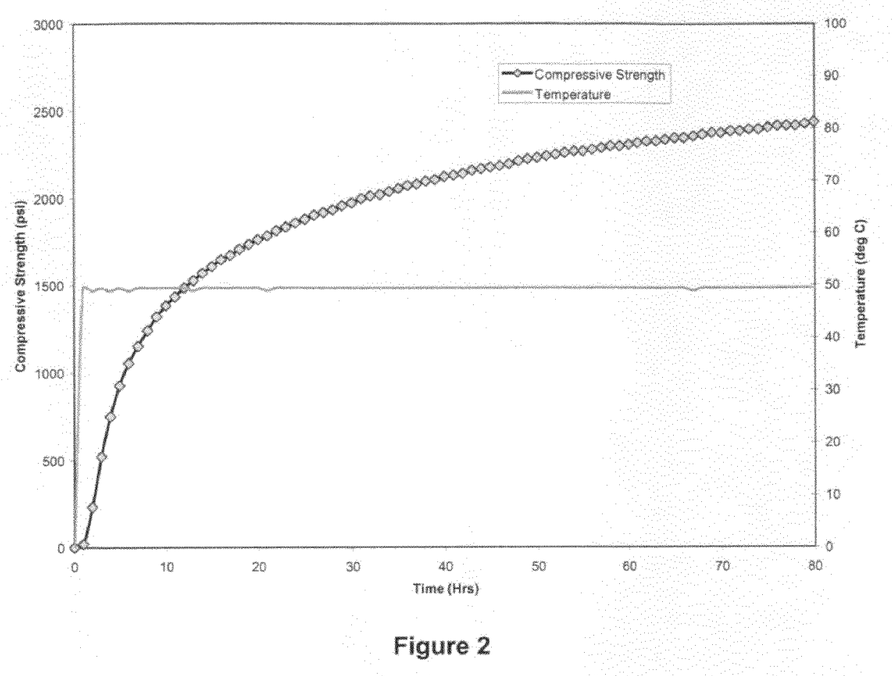
FIG. 2 shows a graph showing strength development of sulfur cement under isothermal conditions.
Figure 3:
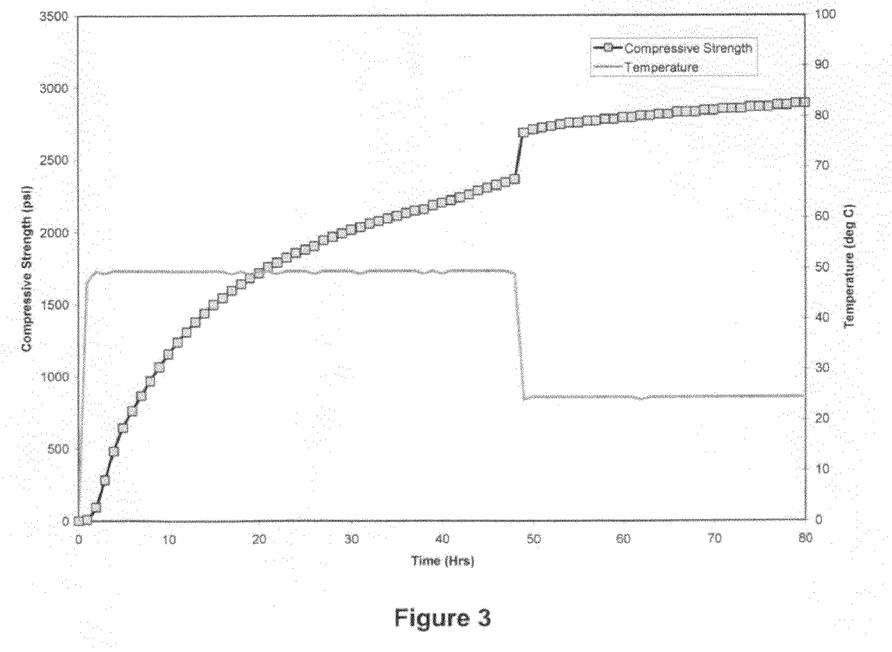
FIG. 3 shows a graph showing strength development of a sulfur cement under variable temperature conditions.

During its lifetime, a wellbore may go under various mechanical or thermal stresses. Therefore, it is important to design a flexible cement system that maintains its integrity and provides superior zonal isolation over an extended time period. In this experiment, the potential of a sulfur containing cement to be used in wells subject to thermal fluctuations was investigated. Compressive strength was measured using a Chandler Model 4262 Twin Cell Ultrasonic Cement Analyzer on a cement blend under isothermal conditions (FIG. 2) and compared to a blend that was subject to variable temperature conditions (FIG. 3). Samples were composed of cement A+25% fly ash+15% sulfur blends with density of 1750 $kg/m^3$. Variable temperature conditions were as follows: 50° C. for 48 hrs and then slowly cooled to 25° C. at a constant pressure of 3000 psi. Over a period of 80 hours, the cement reached a compressive strength of about 2430 psi (16.8 MPa) under isothermal conditions, while under variable temperatures, it reached a final compressive strength of 2890 psi (19.9 MPa). This result was verified by curing cubes of the same blend at 50° C. for 5 days and performing a cube crush test on hot (50° C.) cubes and on cubes left for cooling to room temperature over night. The unconfined compressive strength for hot cubes was measured at 13.6 MPa, while for cold cubes was measured at 18.5 MPa. The same experiment was performed using a cement+fly ash blend (without any sulfur), but no such effect was observed. This experiment revealed that cement-sulfur blends exhibit a property that has not been reported before and that they show enhanced stability under variable temperature conditions.

In addition, dynamic flexural strength effects were measured by varying temperature of sulfur containing cement blends and measuring flexural strength, as shown in Table 2A below.

TABLE 2A

Dynamic flexural strength effects

| Blend | Additives | Flexural Strength (psi) | | | |
|---|---|---|---|---|---|
| | | 7 Days Cold | 7 Days Hot | 14 Days Cold | 14 Days Hot |
| Cem A + 28% fly ash + 7% S | 2% accelerator, 0.3% retarder + 2% cross-linker 1 | NA | 470 | 720 | 540 |
| Cem A + 28% fly ash + 7% S | 2% accelerator, 0.3% retarder + 2% cross-linker 2 | 480 | 360 | 660 | 520 |

Cold: 7 days @ 50 C. + 1 day @ 25 C.
Hot: 7 + 1 days @ 50 C., done when samples were still hot.
Data are mean value of three measurements These results indicate that flexural strength of sulfur containing cement blends is still adequate under fluctuating temperature conditions.

Example 4

Early Strength Development for Normal Density & Lightweight Blends

Compressive strength data from 8 to 48 hours for API Class A and G cement at densities of 1400, 1500, 1750 and 1900 kg/m$^3$ are shown in Tables 3-7. Class A cement is generally used as construction grade cement and is typically more reactive than API Class G cement used in oil well applications. All compressive strength testing was carried out on Chandler Model 4262 Twin Cell ultrasonic cement analyzer according to API procedure 10B. Regulatory authorities require that oilwell cement reach a minimum compressive strength across zones of interest of 3.5 MPa after 48 hours. The following tables show the compressive strength of cement, cement/fly-ash, cement/sulfur and cement/fly-ash/sulfur blends over 48 hours (cement is either API Class A or G). While there was some decrease in the compressive strength of the sulfur-containing cement blends compared to those without sulfur, the results show that cement-sulfur blends met the necessary requirements for compressive strength and that the sulfur can be used to create viable and useful cement blends. Compressive strengths were measured for 48 hours at some typical densities and temperatures.

TABLE 3

Compressive Strength Data for API Class A & G Cements with 1900 kg/m$^3$ density

| Blend* | Temp (° C.) | Compressive Strength (MPa) | | | |
|---|---|---|---|---|---|
| | | 8 hrs | 16 hrs | 24 hrs | 48 hrs |
| Cem A | 25 | 3.04 | 15.25 | 22.20 | 32.23 |
| Cem A + 10% S | 25 | 3.78 | 12.63 | 16.60 | 25.76 |
| Cem A + 20% S | 25 | 4.07 | 12.76 | 16.86 | 22.96 |
| Cem G | 25 | 1.23 | 5.28 | 9.05 | 17.31 |
| Cem G + 10% S | 25 | 1.04 | 5.14 | 9.68 | 16.16 |
| Cem G + 20% S | 25 | 1.15 | 5.40 | 9.75 | 15.22 |

*Additives: 0.5% dispersant

TABLE 4

Compressive Strength Data for API Class A Cement with 1750 kg/m$^3$ density

| Blend | Temp (° C.) | Compressive Strength (MPa) | | | |
|---|---|---|---|---|---|
| | | 8 hrs | 16 hrs | 24 hrs | 48 hrs |
| Cem A | 25 | 1.71 | 6.34 | 10.33 | 15.65 |
| Cem A + 10% S* | 25 | 1.52 | 5.50 | 8.60 | 12.02 |
| Cem A + 20% S* | 25 | 1.30 | 4.61 | 7.49 | 10.07 |
| Cem A + 30% Fly ash* | 25 | 4.46 | 14.94 | 19.54 | 26.11 |
| Cem A + 28% Fly ash + 7% S | 25 | 3.08 | 10.57 | 15.14 | 20.33 |
| Cem A + 25% Fly ash + 15% S | 25 | 2.39 | 8.37 | 12.68 | 16.47 |

*Additives: 1% accelerator

TABLE 5

Compressive Strength Data for API Class G Cement with 1750 kg/m$^3$ density

| Blend | Temp (° C.) | Compressive Strength (MPa) | | | |
|---|---|---|---|---|---|
| | | 8 hrs | 16 hrs | 24 hrs | 48 hrs |
| Cem G* | 25 | 0.65 | 2.58 | 4.37 | 8.74 |
| Cem G + 10% S* | 25 | 0.67 | 2.36 | 3.60 | 5.40 |
| Cem G + 20% S* | 25 | 0.70 | 2.35 | 3.46 | 4.99 |

*Additives: 1% accelerator

TABLE 6

Compressive Strength Data for API Class A Cement with 1500 kg/m$^3$ density

| Blend | Temp (° C.) | Compressive Strength (MPa) | | | |
|---|---|---|---|---|---|
| | | 8 hrs | 16 hrs | 24 hrs | 48 hrs |
| Cem A* | 50 | 2.81 | 4.39 | 4.91 | 5.52 |
| Cem A + 10% S* | 50 | 1.85 | 2.74 | 2.92 | 3.69 |
| Cem A + 10% S** | 50 | 2.84 | 3.68 | 4.05 | 4.59 |
| Cem A + 20% S** | 50 | 1.81 | 2.70 | 3.03 | 3.56 |
| Cem A + 30% Fly ash* | 50 | 3.70 | 5.78 | 7.73 | 12.27 |
| Cem A + 28% Fly ash + 7% S* | 50 | 2.41 | 4.12 | 4.97 | 8.08 |
| Cem A + 25% Fly ash + 15% S* | 50 | 1.97 | 3.41 | 4.35 | 6.03 |

*Additives: 2% accelerator
**Additives, 3% accelerator

TABLE 7

Compressive Strength Data for API Class A Cement with 1400 kg/m$^3$ density

| Blend | Temp (° C.) | Compressive Strength (MPa) | | | |
|---|---|---|---|---|---|
| | | 8 hrs | 16 hrs | 24 hrs | 48 hrs |
| Cem A + 30% Fly ash* | 50 | 1.19 | 2.02 | 2.89 | 5.97 |
| Cem A + 28% Fly ash + 7% S* | 50 | 1.23 | 1.94 | 2.49 | 3.92 |
| Cem A + 30% Fly ash* | 50 | 1.60 | 2.42 | 3.64 | 7.70 |
| Cem A + 28% Fly ash + 7% S* | 50 | 1.17 | 1.81 | 2.40 | 5.00 |
| Cem A + 25% Fly ash + 15% S* | 50 | 0.88 | 1.59 | 2.06 | 3.52 |

*Additives: 2% accelerator

Example 5

Thickening Time Measurements

Thickening time tests are designed to determine the length of time a cement slurry remains in a pumpable, fluid state under simulated well bore conditions of temperature and pressure. The test slurry is evaluated in a pressurized consistometer according to API RP 10B operational procedures. The consistency of each slurry was measured in Bearden units ($B_c$) and is given in Table 8. Experiments were done on slurries with 1400 kg/m$^3$ density and at a bottom hole static temperature (BHST) of 50° C. The end of a test occurs when the cement slurry reaches a consistency of 100 $B_c$. Thickening time variation is strongly dependent on slurry density and its compositions. Decreasing water/cement ratio accelerates cement thickening, while the use of cement retarding agents can prolong thickening time and improve workability. It was found that the addition of 7% and 23% sulfur to cement A+fly ash blends had little or no affect on the thickening time. The rate of early hydration of cement, therefore, did not appear to change in the presence of sulfur. As shown in Table 8, longer thickening times (or slower hydration rates) may be achieved by using a cement retarder such as zinc oxide (Exp. 3, 4 and 9) or sodium gluconate (Exp. 5, 6, 7).

TABLE 8

Thickening time data for API Class A Cement blends with 1400 kg/m$^3$ density

| EXP. # | Blend* | Retarder | BHST (° C.) | Time to 40 $B_c$ | Time to 100 $B_c$ |
|---|---|---|---|---|---|
| 1 | Cem A + 30% Fly ash | none | 50 | 2:03 | 2:30 |
| 2 | Cem A + 28% Fly ash + 7% S | none | 50 | 2:01 | 2:26 |
| 3 | Cem A + 28% Fly ash + 7% S | 0.5% R1 | 50 | 3:38 | 3:52 |
| 4 | Cem A + 28% Fly ash + 7% S | 0.7% R1 | 50 | 5:10 | 5:30 |
| 5 | Cem A + 28% Fly ash + 7% S | 0.3% R2 | 50 | 3:03 | 3:18 |
| 6 | Cem A + 28% Fly ash + 7% S | 0.4% R2 | 50 | 7:21 | 7:40 |
| 7 | Cem A + 28% Fly ash + 7% S | 0.5% R2 | 50 | 9:31 | 10:00 |
| 8 | Cem A + 23% Fly ash + 23% S | none | 50 | 2:15 | 2:50 |
| 9 | Cem A + 23% Fly ash + 23% S | 0.5% R1 | 50 | 3:18 | 3:31 |

*Additives: 3% accelerator,
R1 = Zinc oxide,
R2 = Sodium gluconate

Figure 4:
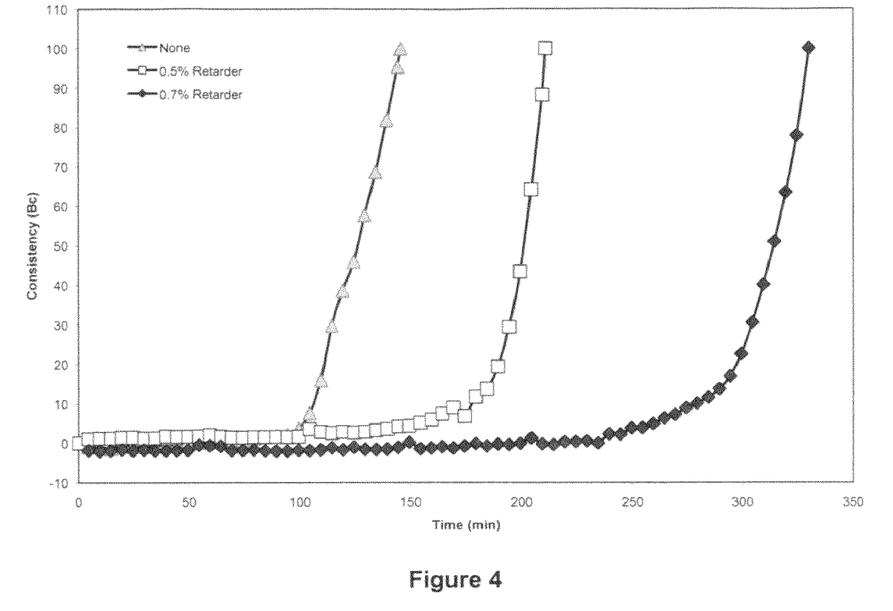
FIG. 4 shows a graph showing thickening time profiles for certain examples of the present invention using a retarding additive.

The term "transition time" is used to refer to the dynamic set profile of cement slurries as exhibited on a pressurized consistometer. Slurries that provide a short transition time are those that demonstrate what is commonly referred to as a "right angle set" on a thickening time chart. Transition time is the period during which the slurry changes from a true hydraulic fluid to a highly viscous mass showing some solid characteristics. By definition a "right angle set" is one in which the viscosity of the slurry remains relatively low through a majority of the test and then rapidly sets in a 20 to 45 minute time frame from 40 to 100 Bearden units of consistency ($B_c$). Right angle set together with static gel strength are important characteristics of cement slurries designed for controlling gas migration that may occur during cementing. In this regard, sulfur-cement blends display surprisingly fast set times from 40 to 100 $B_c$, averaging only about 30 minutes on various loadings of sulfur and additives. This behavior for cement A+28% fly ash+7% sulfur with various amount of retarder is illustrated in FIG. 4.

Example 6

Rheology of Sulfur Containing Blends

Figure 5:
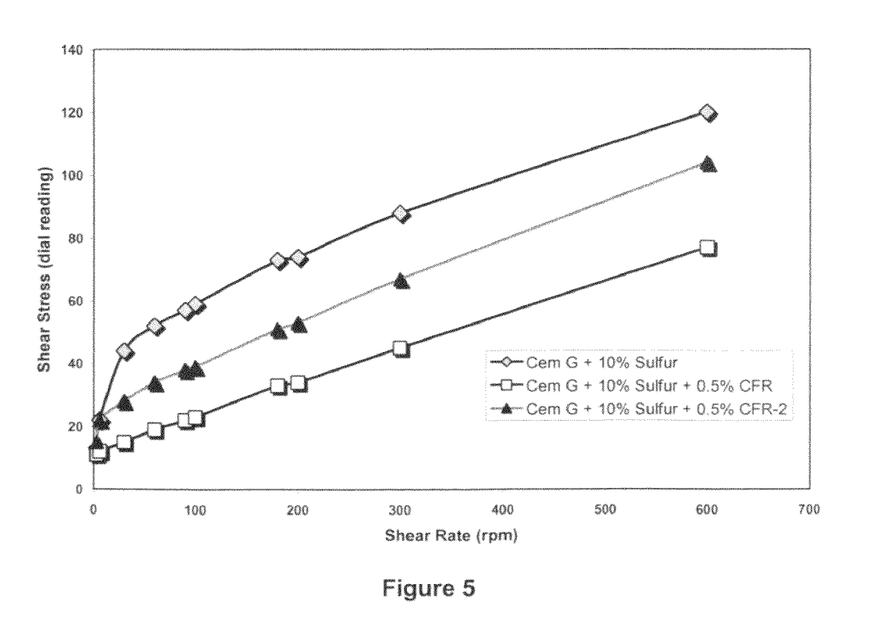
FIG. 5 shows a graph showing rotational viscometer readings for sulfur cement compositions cement and dispersed 1900 kg/m3 API Class G cement slurries at 25° C.
Figure 6:
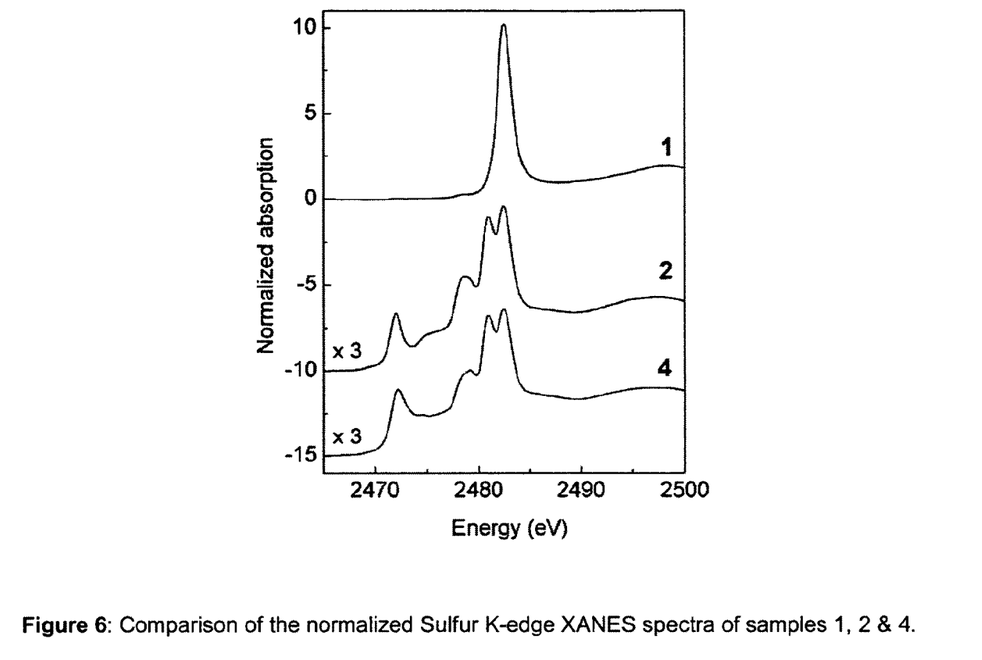
FIG. 6 shows a comparison of the normalized sulfur K-edge XANES spectra of sulfur cement blends.

The rheological behavior of sulfur-cement slurries was studied according to API RP 10B procedures using a rotational viscometer Model 35A (Fann Instrument Co., Houston, Tex.), which enables determination of the yield value and plastic viscosity. FIG. 5 shows shear stress/shear rate plots for neat sulfur-cement and dispersed slurries. As shown in FIG. 5 and Table 9, cement dispersants reduce both yield value and plastic viscosity of the sulfur containing cement blends. D1 (sodium salt of polynaphtalene sulfonic acid) and D2 (sodium salt of polymelamine sulfonic acid) are commonly used as cement dispersants and are readily available from various suppliers.

TABLE 9

Rheology Data for API Class G cement and 10% sulfur with 1900 kg/m$^3$ density at 25° C.

| Dispersant (0.5%) | RPM Readings | | | | | | | | | |
|---|---|---|---|---|---|---|---|---|---|---|
| | 600 | 300 | 200 | 180 | 100 | 90 | 60 | 30 | 6 | 3 |
| None | 120 | 88 | 74 | 73 | 59 | 57 | 52 | 44 | 22 | 13 |
| D1 | 77 | 45 | 34 | 33 | 23 | 22 | 19 | 15 | 12 | 11 |
| D2 | 104 | 67 | 53 | 51 | 39 | 38 | 34 | 28 | 22 | 15 |

Example 7

Static Gel Strength Development

Gas migration is a complex phenomenon involving fluid density control, mud removal, cement slurry properties, cement hydration and interactions between the cement, casing and formation. Once the slurry is static, immediately after placement, it will start developing static gel strength (SGS) that will continue to increase until the cement is fully set. SGS is developed due to the internally developed rigid network structure in the cement matrix that resists a force placed upon it. As gel strength increases, the cement column begins to partially support itself. This time is called the "critical interval" and is defined as the time required for static gel strength to increase from 100 lb/100 ft$^2$ to 500 lb/100 ft$^2$. Optimum slurry design often requires a short critical interval, longer zero gel time (ZGT) and right angle set behavior. The ZGT is defined as the time it takes to reach a static gel strength of 100 lb/100 ft$^2$ after the slurry becomes static. Here a Static Gel Strength Analyzer (Model 5265 from Chandler Engineering) was used to measure static gel strength and compressive strength from a single sample. As shown in Table 10, sulfur-cement blends exhibit short critical intervals and fast setting behavior, which make them suitable for cementing wells with potential gas migration problems.

TABLE 10

Comparison of Static gel strength and compressive strength data for API Class A Cement and sulfur blends with 1500 kg/m³ density.

| Blend* | BHST | Time to 100 lb/ 100 ft² (hr:min) | Time to 500 lb/ 100 ft² (hr:min) | Time to 1200 lb/ 100 ft² (hr:min) | Critical Interval (min) | Compressive Strength (MPa) | | | |
|---|---|---|---|---|---|---|---|---|---|
| | | | | | | 8 hrs | 16 hrs | 24 hrs | 48 hrs |
| Cem A + 25% Fly ash + 15% Sulfur | 25 | 00:58 | 01:26 | 01:52 | 28 | 1.01 | 3.08 | 4.23 | 5.60 |
| Cem A + 25% Fly ash + 15% Sulfur | 50 | 01:31 | 01:47 | 01:58 | 16 | 2.21 | 3.53 | 4.29 | 6.08 |

*Additives: 2.25% accelerator

Example 8

Acid Resistance

High rate acid gas injection wells, $CO_2$ injection enhanced oil recovery wells or reservoirs that are naturally high in $CO_2$ content pose a significant challenge for the design of cementing systems. The presence of down hole $CO_2$ can result in the formation of carbonic acid which can react with alkali components in the cement, resulting in a loss of cement sheath integrity. Dealing with an acidic environment requires an understanding of the chemistry of cement reactivity and key parameters of the system under investigation such as: partial pressure of $CO_2$, exposure time, relative humidity, bottom hole temperature, cement permeability, cement surface area, and cement age.

Carbonation is a slow reaction which is mainly governed by the $CO_2$ diffusion rate and available water. Therefore, it is commonly accepted that low cement permeability significantly improves $CO_2$ resistance. Action of $CO_2$ starts at the cement surface and in the case of low permeability, or low $CO_2$ diffusion rates, the reaction rate becomes more dependent on the dissolution of reaction products in aqueous medium (a wash out mechanism).

To increase the acid resistance of cement, special additives such as polymers and copolymers (i.e. latex) are commonly used. These materials generally lower the cement permeability and form a barrier between the cement matrix and the acidic medium.

Figure 7:
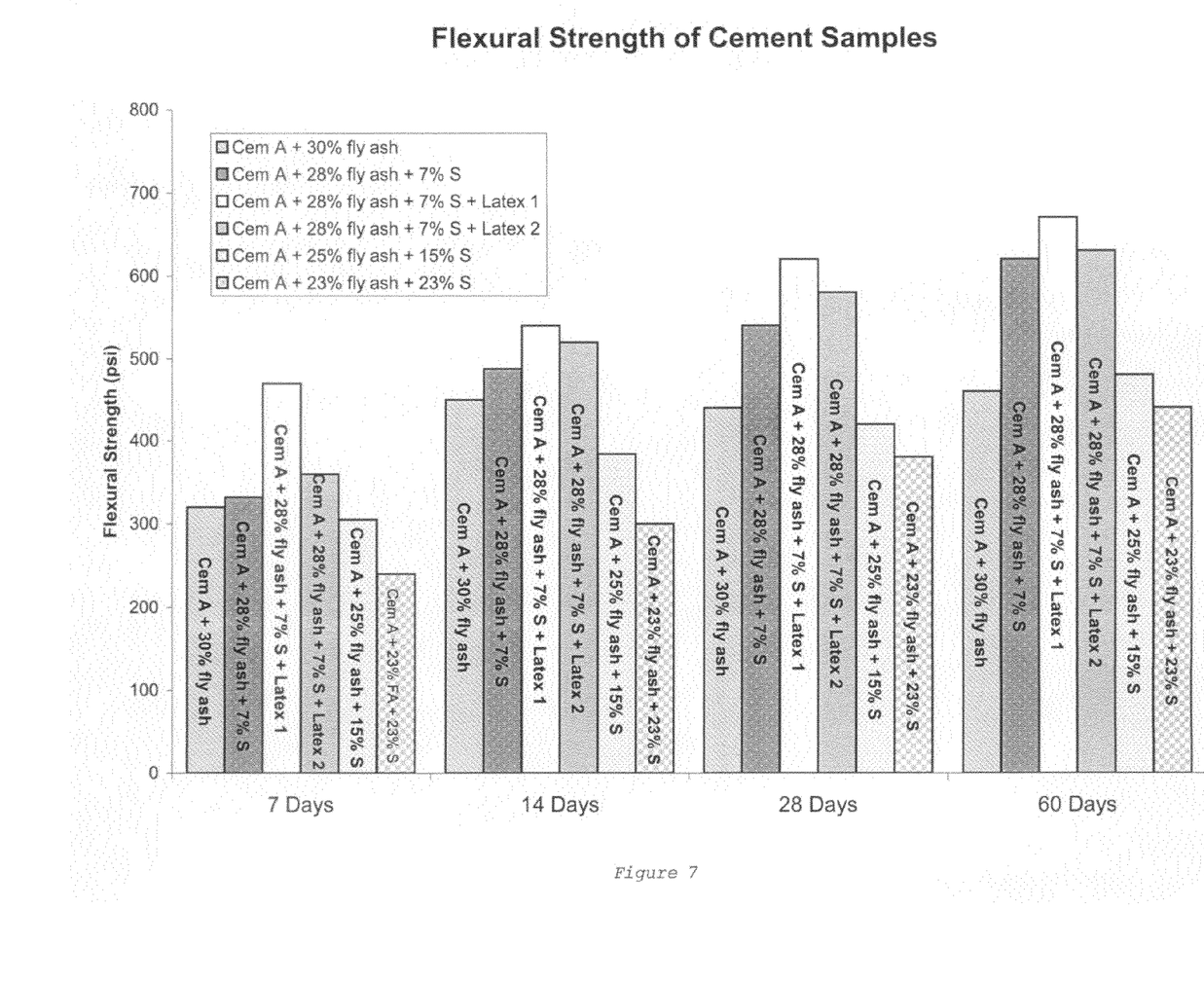
FIG. 7 shows a chart showing flexural strength of various cements blends.
Figure 8:
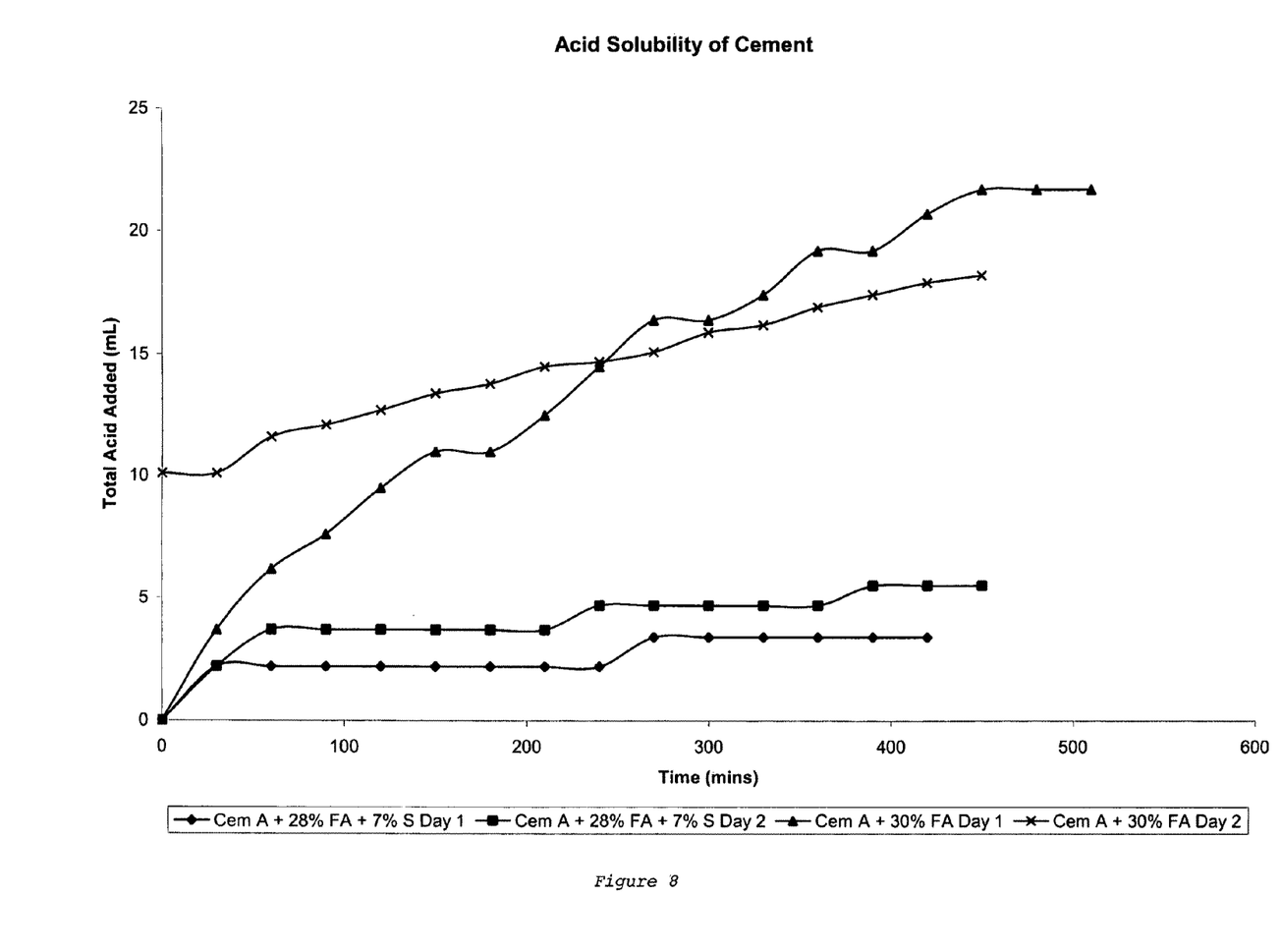
FIG. 8 shows a graph showing solubility of cement samples, calculated from ml of acid consumed during the titration for neutralizing the $Ca(OH)_2$ content in cement.

To investigate the behavior of cement-sulfur blends in acidic environment, an acid solubility test was done. Cement samples with cylinder shape of size 2.5 cm (Ø) and 2.5 cm (h) were cured at room temperature for one week at 100% relative humidity. Each sample was then immersed in a large volume (800 ml) of de-ionized water. The solution pH was reduced to 4.0±0.2 by gradual addition of a 0.1 N nitric acid solution. Reaction of the $Ca(OH)_2$ contained in the cement with the acid will result in an increase in solution pH. Therefore, the amount of acid required to maintain a pH of 4 was considered representative of the acid solubility of the cement sample. The titration process was monitored using a pre-calibrated HORIBA pH-meter model Navi F-54BW and readings were taken hourly for a period of 48 hours. The cement sample was then removed, washed with water and dried. The solubility of each sample was calculated from ml of acid consumed during the titration for neutralizing the $Ca(OH)_2$ content in cement, as shown in FIG. 7. The acid solubility of a Cem A+30% fly ash blend was compared with that of a Cem A+28% fly ash+7% sulfur blend in Table 11. Over two consecutive days, blends containing 7% sulfur showed up to 6 times lower solubility compared to other blend.

TABLE 11

Acid solubility of cement slurries with density of 1750 kg/m³

| Initial mass (g) | Blend | 1$^{St}$ Day Titration Time (min) | Dissolved Ca(OH)₂ (mmol) | (mg) | 2$^{nd}$ Day Titration Time (Min) | Dissolved Ca(OH)₂ (mmol) | (mg) |
|---|---|---|---|---|---|---|---|
| 23.159 | Cem A + 30% Fly Ash* | 510 | 1.35 | 100.0 | 450 | 1.13 | 83.72 |
| 23.075 | Cem A + 28% Fly Ash + 7% Sulfur** | 420 | 0.21 | 15.55 | 450 | 0.34 | 25.19 |

*+1% accelerator
**+1% accelerator + 0.3% retarder

Therefore, it is concluded that the addition of sulfur to cement shows resistance against an acidic environment, and improves resistance compared to some non-sulfur containing blends.

Example 9

Chemical Speculation of Sulfur in Cement

Sulfur K-edge X-ray absorption near edge structure (XANES) spectroscopy was used to investigate the oxidation state of sulfur in cured cement blends to investigate whether it is involved in reactions with the cement matrix. The intensity of the absorption also provides a semi-quantitative determination of sulfur species in a given sample that includes reduced and oxidized functional sulfur groups.

The samples were measured at the Stanford Synchrotron Radiation Laboratory (SSRL) in California, US and the composition of the samples is provided in Table 12.

TABLE 12

Samples prepared for XAS analysis

| # | Blend | Additives | Curing Condition Temp °C. | Time Days |
|---|---|---|---|---|
| 1 | Cem A + 30% FA | 2% accelerator + 0.3% retarder | 50 | 7 |
| 2 | Cem A + 28% FA + 7% S | 2% accelerator + 0.3% retarder | 50 | 7 |
| 3 | Cem A + 28% FA + 7% S | 2% accelerator + 0.3% retarder | 70 | 7 |
| 4 | Cem A + 28% FA + 7% S | 2% accelerator + 0.3% retarder + 1% cross-linker 1 | 50 | 7 |
| 5 | Cem A + 28% FA + 7% S | 2% accelerator + 0.3% retarder + 1% cross-linker 1 | 50 | 75 |

The sulfur XANES spectrum of each sample was analyzed by fitting a linear combination of standard spectra, using sulfur XANES spectra of known sulfur compounds as standards. The curve fitting data for samples 1-5 are summarized in Table 13 and shows that oxidized sulfur species were formed during the cement hydration process. Semi-quantitative analysis of the sulfur species showed that a significant portion of elemental sulfur was transformed to oxidized species ($S_2O_3^{2-}$, $SO_3^{2-}$ and —$SO_3H$). Furthermore, in the presence of Latex DL 240 (a styrene-butadiene copolymer), some of sulfur reacted with the copolymer forming a rubber like compound. This indicated that elemental sulfur does not remain as a neutral filler in cement but undergoes a series of chemical reactions, forming oxidized and reduced species that can be incorporated into cement matrix and contribute to the microscopic and macroscopic properties of the slurry.

TABLE 13

Sulfur K-edge XANES fitting results (in S atom %) for cement samples

| Sample No. | $SO_4^{2-}$ | $S_2O_3^{2-}$ | $S_8$ | $SO_3^{2-}$ | —$SO_3H$ | C—$(S)_x$—C |
|---|---|---|---|---|---|---|
| 1 | 100 | — | — | — | — | — |
| 2 | 12 | 57 | 15 | 10 | 6 | — |
| 3 | 10 | 48 | 28 | 7 | 7 | — |
| 4 | 10 | 47 | 19 | 6 | 6 | 12 |
| 5 | 11 | 39 | 23 | 5 | 5 | 17 |

Example 10

Mechanical Properties of Cement Sulfur Blends

Downhole changes may cause sufficient stress to alter the cement sheath and remove the zonal isolation that was created upon primary cementing. Mechanical failure leads to the formation of cracks, while debonding leads to the creation of microannuli. This can create a path of potential fluid conductivity and gas migrations.

In order to avoid mechanical damage, cements with high ratio of tensile strength to Young's modulus, and low Young's modulus compared with that of the rock are the optimum cements in terms of mechanical durability.

Testing of elastic and compressive properties of cement compositions are known in the art. Young's Modulus is a measure of stiffness relating the elastic deformation of a material to the stress applied to the material. This allows the behavior of the material under load to be calculated. When a sample of material is stretched in one direction it tends to get thinner in the other two directions. Poisson's ratio is the ratio of transverse contraction strain to longitudinal extension strain in the direction of stretching force. The Poisson's ratio of a stable material must be between −1.0 and +0.5, with the ratio for most materials falling between 0.0 and 0.5.

The mechanical properties of two sulfur containing cement compositions having the density of 1400 kg/m³ were compared to a sulfur-free cement blend (see Table 14).

TABLE 14

Mechanical properties of some cement slurries with density of 1400 kg/m³

| Blend | Additives | Compressive Strength (MPa) | Young's Modulus (GPa) | Poisson's Ratio | CS/YM Ratio × 1000 |
|---|---|---|---|---|---|
| Cem A + 30% FA | 2% accelerator + 0.3% retarder | 8.75 | 4.95 | 0.255 | 1.767 |
| Cem A + 28% FA + 7% S | 2% accelerator + 0.3% retarder | 4.47 | 2.05 | 0.115 | 2.180 |
| Cem A + 28% FA + 7% S | 2% accelerator + 0.3% retarder + 2% sulfur cross-linker 2 | 6.03 | 3.20 | 0.140 | 1.884 |

**Averaged on two samples after curing for 7 days at 50° C. in a water bath.

The lower the Young's Modulus, the more flexible a cement is (the more it can deform without breaking). However, it is important not to optimize the Young's Modulus to the detriment of compressive strength or flexural strength. The results show that cement blends containing sulfur exhibit a lower Young's Modulus compared to sulfur-free cements while still maintaining necessary compressive strength. As seen in Table 14 the sulfur containing blends have higher compressive strength to Young's Modulus ratio compared to cement and fly ash blend. Poisson's ratio for the sulfur containing cements falls within an acceptable range for well cementing use.

References: The following references are referred to herein, and the entire contents of which are incorporated herein by reference, where permitted, as if reproduced herein in their entirety.

1) J. S. Damtoft, J. Lukasik, D. Herfort, D. Sorrentino, E. M. Gartner, "Sustainable development and climate change initiatives", *Cement and Concrete Research,* 2008, 38, 115-127.
2) E. Gartner, "Industrially interesting approaches to low-$CO_2$ cements", *Cement and Concrete Research,* 2004, 34, 1489-1498.
3) E. B. Nelson, D. Guillot, "Well Cementing", $2^{nd}$ Edition, Schlumberger, Sugar Land, Tex., 2006.
4) J. E. Kogel et al., (Ed.), "Industrial Minerals and Rocks: Commodities, Markets and Uses", $7^{th}$ Edition, Society for Mining, Metallurgy and Exploration Inc., 2006, Littleton, Colo., USA.
5) "ASTM C348-02 Standard Test Method for Flexural Strength of Hydraulic Cement Mortars", ASTM International, 2002.

The invention claimed is:

1. A cement composition for use in a cementing process of an oil and gas well, said composition comprising elemental sulfur, Portland cement, and sufficient water to create a pumpable slurry, the composition being free of aggregate.

2. The composition of claim 1 further comprising one or more of the following additives: a retarder, a fluid loss control agent, an accelerator, a dispersant, a cementitious material, or a pozzolanic material.

3. The composition of claim 2 further comprising fly ash.

4. The composition of claim 1 wherein the Portland cement is a type A cement or a type G cement.

5. The composition of claim 1 wherein the elemental sulfur is finely divided elemental sulfur.

6. The composition of claim 5 wherein the elemental sulfur has an average particle size less than about 1 mm.

7. The composition of claim 1 wherein the elemental sulfur comprises more than about 0% and less than about 40% by weight of blend of the cement composition.

8. The composition of claim 7 wherein the elemental sulfur comprises more than about 5% and less than about about 30% by weight of blend of the cement composition.

9. The composition of claim 8 wherein the elemental sulfur comprises more than about 10% and less than about about 20% by weight of blend of the cement composition.

10. The composition of claim 1 wherein the elemental sulfur comprises high purity elemental sulfur, with less than about 2% impurities by weight.

11. The composition of claim 1 further comprising a sulfur cross-linking agent.

12. The composition of claim 11 wherein the sulfur cross-linking agent comprises a styrene-butadiene copolymer or a poly-sulfur silane coupling agent.

13. The cement composition of claim 1, wherein the cement composition shows continuing increases in compressive strength when cured, over a two week period.

14. The cement composition of claim 1, wherein the cement composition has a higher flexural strength than a similar cement composition not containing the sulfur component.

15. The cement composition of claim 1, wherein the cement composition has a higher compressive strength when cured under variable temperature conditions than when cured under isothermal conditions.

16. The cement composition of claim 1, wherein the cement composition has a higher compressive strength to Young's modulus ration than a similar cement composition not containing the elemental sulfur.

* * * * *